US012313184B2

(12) United States Patent
Oostveen

(10) Patent No.: US 12,313,184 B2
(45) Date of Patent: May 27, 2025

(54) COVER FOR A VALVE HANDLE AND AN ASSEMBLY OF A VALVE INCLUDING A VALVE HANDLE AND A COVER

(71) Applicant: QOS Group B.V., Maarssen (NL)

(72) Inventor: Elmar Oostveen, Nieuwersluis (NL)

(73) Assignee: QOS Group B.V., Maarssen (NL)

( * ) Notice: Subject to any disclaimer, the term of this patent is extended or adjusted under 35 U.S.C. 154(b) by 0 days.

(21) Appl. No.: 18/462,812

(22) Filed: Sep. 7, 2023

(65) Prior Publication Data
US 2024/0077145 A1    Mar. 7, 2024

(30) Foreign Application Priority Data
Sep. 7, 2022    (NL) .................................... 2032974

(51) Int. Cl.
*F16K 31/60*      (2006.01)
(52) U.S. Cl.
CPC .......... *F16K 31/602* (2013.01); *F16K 31/607* (2013.01)
(58) Field of Classification Search
CPC ...... F16K 31/60; F16K 31/602; F16K 31/607; F16K 31/605; E03C 1/0412; Y10T 137/6024
See application file for complete search history.

(56) References Cited

U.S. PATENT DOCUMENTS

| | | | |
|---|---|---|---|
| 6,932,638 B1 * | 8/2005 | Burrows ................ | H01R 35/04 439/364 |
| 9,309,988 B2 * | 4/2016 | Rocheleau ............ | F16K 31/602 |
| 2012/0153203 A1 * | 6/2012 | Rocheleau ............ | F16K 31/602 251/231 |
| 2014/0069524 A1 * | 3/2014 | Faulkenberry .......... | F16K 27/00 137/377 |
| 2014/0261820 A1 | 9/2014 | Bares et al. | |
| 2015/0034854 A1 * | 2/2015 | Gutmann ................ | F16K 35/10 251/308 |
| 2018/0372235 A1 * | 12/2018 | Smith .................... | F16K 27/065 |
| 2020/0263807 A1 * | 8/2020 | Whiteley ................ | F16K 35/04 |

OTHER PUBLICATIONS

Search Report and Written Opinion in corresponding Netherlands application No. 2032974 dated Apr. 18, 2023.

* cited by examiner

*Primary Examiner* — Jessica Cahill
(74) *Attorney, Agent, or Firm* — Steven M. Koehler; Westman, Champlin & Koehler, P.A.

(57) ABSTRACT

A cover for a valve handle comprises an elongate base including a front side and a rear side, a protrusion for being inserted into a corresponding hole of the valve handle. The protrusion projects from the rear side of the base. A retaining element extends opposite to the rear side and is fixed to the base. The base and the retaining element together define a receiving space including an opening for receiving a free end of the valve handle. The opening is located at a distance from the protrusion in longitudinal direction of the base and directed to the protrusion.

15 Claims, 2 Drawing Sheets

COVER FOR A VALVE HANDLE AND AN ASSEMBLY OF A VALVE INCLUDING A VALVE HANDLE AND A COVER

BACKGROUND

The discussion below is merely provided for general background information and is not intended to be used as an aid in determining the scope of the claimed subject matter.

The present invention relates to a cover for a valve handle.

Such a cover is known in the prior art. The known cover may be provided with an indication sign, for example a unique number, in order to keep the valve to which the cover is mounted identifiable during its lifetime.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A cover comprises an elongate base including a front side and a rear side, a protrusion for being inserted into a corresponding hole of a valve handle, wherein the protrusion projects from the rear side of the base, and a retaining element which extends opposite to the rear side and is fixed to the base, wherein the base and the retaining element together define a receiving space including an opening for receiving a free end of the valve handle, wherein the opening is located at a distance from the protrusion in longitudinal direction of the base and directed to the protrusion.

The cover provides the opportunity to select the distance between the protrusion and the receiving space such that during inserting the cooperating valve handle into the receiving space the protrusion can move towards a corresponding hole in the valve handle and finally move into the corresponding hole.

In a preferred embodiment the cover comprises a resiliency which allows the receiving space and the protrusion to move elastically relative to each other, since this provides the opportunity to mount the cover onto a rigid valve handle. After inserting the rigid valve handle into the receiving space and displacing the cover with respect to the valve handle such that the protrusion moves towards the corresponding hole in the valve handle, the protrusion and the receiving space can elastically move with respect to each other such that the protrusion finally snaps into the corresponding hole. The snapping effect makes loosening of the cover from the valve handle difficult, which minimizes the risk of tampering.

In a practical embodiment the base is elastically bendable so as to create the resiliency.

The base may be plate-shaped and extend in a main plane.

The base may be elastically bendable about an imaginary axis which extends in transverse direction of the longitudinal direction of the base between the protrusion and the opening and parallel to the main plane at the rear side of the base.

The base may have a banana-shape within the main plane, which means that it is curved in order to cover a curved valve handle.

Preferably, the retaining element is provided with an auxiliary protrusion which is directed to the rear side of the base for being inserted into a corresponding hole of the valve handle, since the resulting additional fixture of the cover makes loosening the cover from the valve handle more difficult.

The retaining element may be formed by a retaining wall which extends substantially parallel to the rear side.

The retaining wall may be fixed to the base by opposite side walls such that the base, the side walls and the retaining wall surround the receiving space.

The cover may be made in one piece, for example by means of injection moulding. In particular when applied in food industry it is desired to minimize the number of separate parts.

The cover may be provided with an anti-tampering part which is pivotally mounted to one of the side walls through a living hinge and fixed to the cover through a breakable connection at a distance from the living hinge.

An aspect of the invention is also related to an assembly of a valve including a valve handle and a cover for a valve handle as described hereinbefore, wherein the valve handle and the cover are adapted such that during assembling the valve and the cover a free end of the valve handle is received by the receiving space and the protrusion snaps in a corresponding hole of the valve handle.

The corresponding hole of the valve handle in which the protrusion fits may be located at an axis of rotation of the valve handle. The axis of rotation may also be the axis of rotation of a valve closure of the valve to which the valve handle is mounted. For example, the valve may be a butterfly valve.

The protrusion may have a central through-hole, which provides access to a shaft, that is operable by the valve handle. The through-hole may provide the opportunity to insert a tool for adapting the orientation of the shaft relative to the valve handle and/or fixing the shaft to the valve handle during a manufacturing process of the valve.

BRIEF DESCRIPTION OF THE DRAWINGS

Aspects of the invention will hereafter be elucidated with reference to the schematic drawings showing embodiments of the invention by way of example.

DETAILED DESCRIPTION OF THE ILLUSTRATIVE EMBODIMENT

Figure 1:
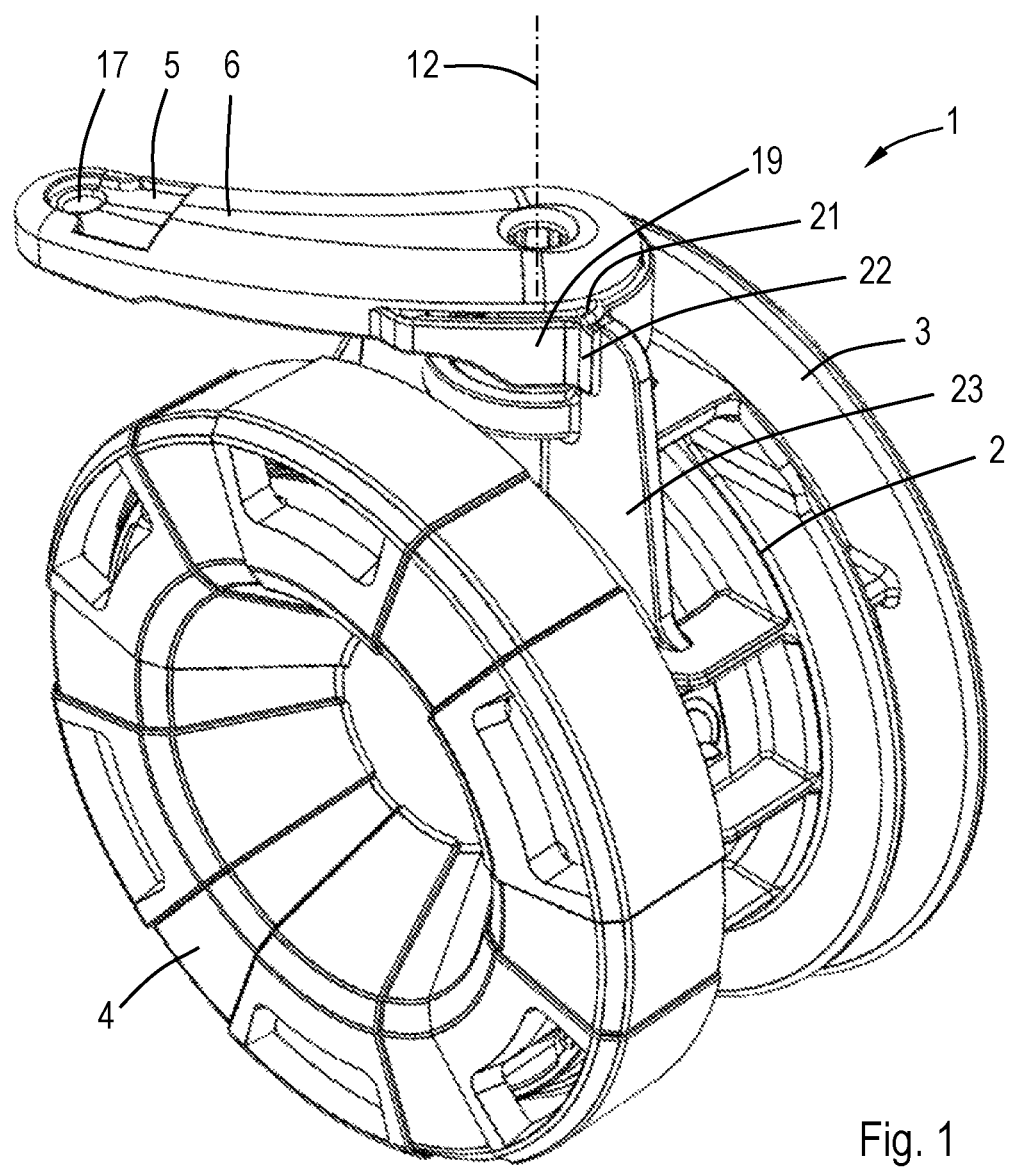
FIG. 1 is a perspective view of an embodiment of an assembly of a valve including a valve handle and a cover.

FIG. 1 shows a valve 1 which is intended to be attached to a container (not shown). The valve 1 has a plastic housing 2 including a flange 3 which can be glued or welded to the container. The housing 2 has a tubular portion which is provided with an external screw thread on which a screw cap 4 is screwed. The valve 1 as shown in FIG. 1 is a butterfly valve including a closure plate (not shown) which is fixed to a shaft, but it may also be a different valve type, for example a ball valve. The shaft of the closure plate is fixed to a valve handle 5 which can be operated manually to open or close the closure plate. The valve handle 5 is provided with a cover 6, which is shown as a separate part in detail in FIGS. 2 and 3.

The cover 6 comprises an elongate plate-shaped base 7 which has a front side 8 and a rear side 9. The base 7 extends in a main plane and has a curved shape like a banana. Other shapes, for example a straight base 7, are also conceivable. A side wall 10 extends along a circumference of the base 7, which side wall projects from the rear side 9 and surrounds the valve handle 5.

Figure 2:
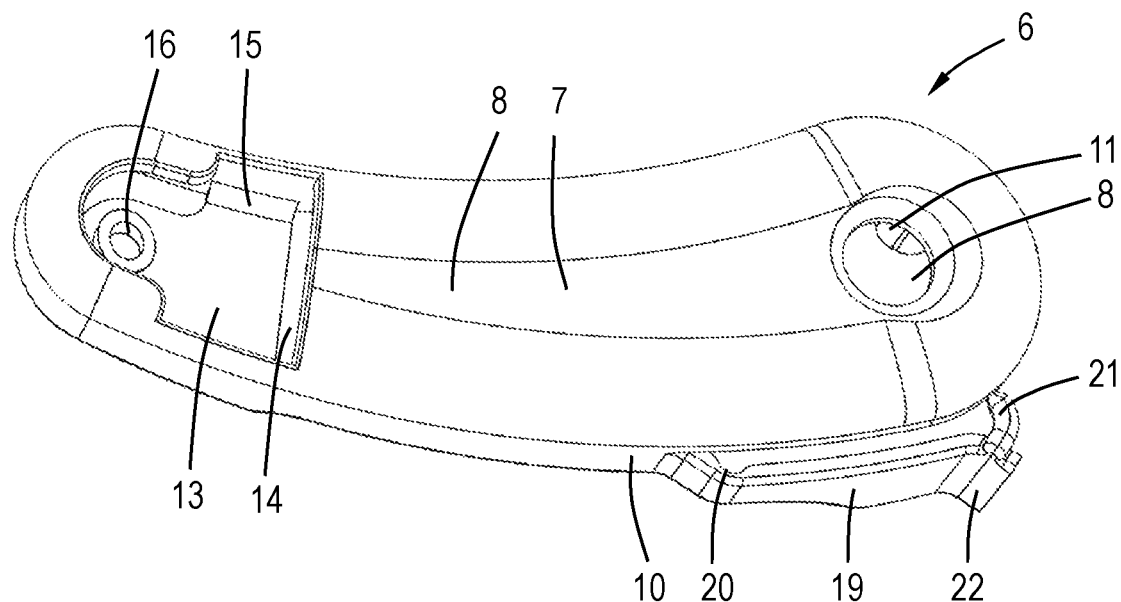
FIG. 2 is a similar view as FIG. 1, but showing the cover as a separate part on a larger scale.
Figure 3:
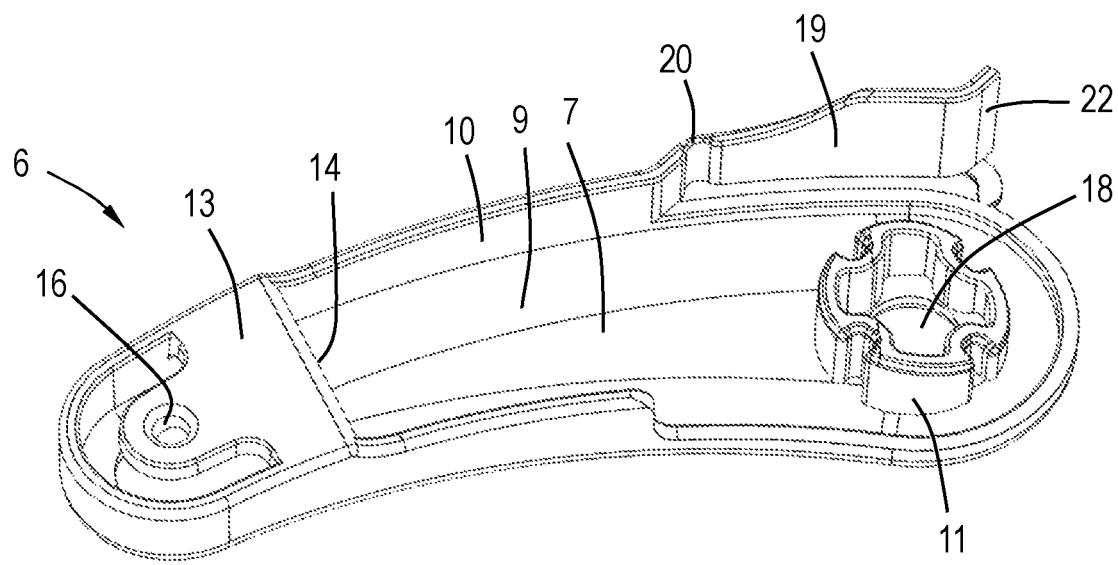
FIG. 3 is a similar view as FIG. 2, but showing a different side of the cover.

The cover 6 is provided with a main protrusion 11 which is intended to be inserted into a corresponding hole of the valve handle 5 at an axis of rotation 12 thereof. The main protrusion 11 projects from the rear side 9 of the base 7. The cover 6 is also provided with a retaining wall 13 which extends opposite to the rear side 9 and extends substantially parallel to the rear side 9. The retaining wall 13 is fixed to the base 7 through the side wall 10. The base 7, the retaining wall 13 and the side wall 10 together define a receiving space including an opening 14 for receiving a free end of the valve handle 5. The opening 14 is located at a distance from the main protrusion 11 and directed to the main protrusion 11. FIGS. 2 and 3 show that a projection of the retaining wall 13 on the base 7 forms a corresponding through-hole 15 in the base 7. This means that in this case the retaining wall 13 and the base 7 do not overlap each other. FIG. 1 shows that the valve handle 5 is visible through the through-hole 15 in the base 7 of the cover 6. In an alternative embodiment the through-hole 15 may be closed.

The retaining wall 13 is provided with an auxiliary protrusion 16 which is directed to the rear side 9 of the base 7, i.e. in opposite direction of the main protrusion 11. The auxiliary protrusion 16 fits in a corresponding hole 17 in the valve handle 5 near its free end.

The cover 6 can be mounted to the valve handle 5 by inserting the free end of the valve handle 5 into the opening 14 and sliding the cover 6 in its longitudinal direction over the valve handle 5 in a direction from its free end to the hole in the valve handle 4 at the axis of rotation 12. During this movement the base 7 will be bent slightly outwardly, since the free end of the valve handle 5 slides along the rear side 9 of the base 7 of the cover 6, whereas the main protrusion 11 slides over to valve handle 5. The base 7 is elastically bendable about an imaginary axis which extends in transverse direction of the longitudinal direction of the base 7 between the main protrusion 11 and the opening 14 and parallel to the main plane at the front side 8 of the base 7. The cover 6 is adapted such that after moving it along a predetermined distance the main protrusion 11 snaps into the corresponding hole in the valve handle 4 at the axis of rotation 12 and the auxiliary protrusion 16 snaps into the corresponding hole 17 in the valve handle 4. For this reason, the auxiliary protrusion 6 is located on an elastic lip of the retaining wall.

The main protrusion 11 has a central through-hole 18 which allows to reach the shaft of the closure plate by a tool in order to orient and fix the shaft of the closure plate and the valve handle 5 with respect to each other in a manufacturing process.

The cover 6 is also provided with an anti-tampering part 19 which is pivotally mounted to the side wall 10 through a living hinge 20 and fixed to the side wall 10 through a breakable connection 21. The first time the closure plate of the valve 1 is opened a lip 22 at a free end of the anti-tampering part 19 moves along a guide 23 of the housing 2 of the valve 1 such that the anti-tampering part 19 is moved with respect to the base 7. Consequently, the connection 21 is broken and the anti-tampering part 19 pivots with respect to the base 7.

Due to the snapping effect it is difficult to loosen the cover 6 from the valve handle 5. This is advantageous, since in practice the cover 6 is intended to remain on the valve handle 5 during the lifetime of the valve 1. A code may be provided on the cover 6 such that the valve 1 remains identifiable during its lifetime. It is also possible to provide the cover 6 with a color which corresponds to the type of valve, for example, indicating whether the valve may be treated with steam or not.

The invention is not limited to the embodiment shown in the drawings and described hereinbefore, which may be varied in different manners within the scope of the claims and their technical equivalents.

What is claimed is:

1. A cover for a valve handle, comprising:
   an elongate base including a front side and a rear side;
   a protrusion for being inserted into a corresponding hole of the valve handle, wherein the protrusion projects from the rear side of the base;
   a retaining element which extends opposite to the rear side and is fixed to the base, wherein the base and the retaining element together define a receiving space including an opening configured to receive a free end of the valve handle, and wherein the opening is located at a distance from the protrusion in a longitudinal direction of the base and directed to the protrusion, wherein the retaining element is formed by retaining wall that extends substantially parallel to the rear side, and wherein the retaining wall is fixed to the base by opposite side walls such that the base, the side walls and the retaining wall sorround the receiving space; and
   an anti-tampering part which is pivotally mounted to one of the side walls through a living hinge and fixed to the cover through a breakable connection at a distance from the living hinge.

2. The cover according to claim 1, wherein the cover comprises a resiliency that allows the receiving space and the protrusion to move elastically relative to each other.

3. The cover according to claim 2, wherein the base is elastically bendable so as to create the resiliency.

4. The cover according to claim 3, wherein the base is elastically bendable about an imaginary axis that extends in transverse direction of the longitudinal direction of the base between the protrusion and the opening and parallel to a main plane at the rear side of the base.

5. The cover according to claim 4, wherein the base has a banana-shape within the main plane.

6. The cover according to claim 1, wherein the base is plate-shaped and extends in a main plane.

7. The cover according to claim 6, wherein the base is elastically bendable about an imaginary axis that extends in transverse direction of the longitudinal direction of the base between the protrusion and the opening and parallel to the main plane at the rear side of the base.

8. The cover according to claim 7, wherein the base has a banana-shape within the main plane.

9. The cover according to claim 6, wherein the base has a banana-shape within the main plane.

10. The cover according to claim 1, wherein the retaining element is provided with an auxiliary protrusion which is directed to the rear side of the base and configured for insertion into a corresponding hole of the valve handle.

11. The cover according to claim 1, wherein the cover is made in one piece.

12. An assembly of a valve comprising:
    a valve handle; and
    a cover for the valve handle, the cover comprising:
        an elongate base including a front side and a rear side;

a protrusion for being inserted into a corresponding hole of the valve handle, wherein the protrusion projects from the rear side of the base;

a retaining element which extends opposite to the rear side and is fixed to the base, wherein the base and the retaining element together define a receiving space including an opening configured to receive a free end of the valve handle, and wherein the opening is located at a distance from the protrusion in a longitudinal direction of the base and directed to the protrusion and wherein the protrusion snaps in a corresponding hole of the valve handle, wherein the retaining element is formed by a retaining wall that extends substantially parallel to the rear side, and wherein the retaining wall is fixed to the base by opposite side walls such that the base, the side walls and the retaining wall surround the receiving space; and an anti-tampering part which is pivotally mounted to one of the side walk through a living hinge and fixed to the cover thro ugh a breakable connection at a distance from the living hinge.

13. The assembly according to claim 12, wherein the corresponding hole of the valve handle in which the protrusion fits is located at an axis of rotation of the valve handle.

14. The assembly according to claim 13, wherein the protrusion has a central through-hole, which provides access to a shaft, that is operable by the valve handle.

15. The assembly according to claim 12, wherein the protrusion has a central through-hole, which provides access to a shaft, that is operable by the valve handle.

\* \* \* \* \*